United States Patent [19]

Choate et al.

[11] Patent Number: 4,722,255
[45] Date of Patent: Feb. 2, 1988

[54] SHEET CUTTING AND TRANSPORTING SYSTEM

[75] Inventors: Bruce T. Choate; Steven J. Portalupi, both of Akron, Ohio

[73] Assignee: The Goodyear Tire & Rubber Company, Akron, Ohio

[21] Appl. No.: 935,798

[22] Filed: Nov. 28, 1986

[51] Int. Cl.⁴ .................... B26D 1/06; B29D 30/04
[52] U.S. Cl. ............................ 83/23; 83/56;
  83/155; 83/222; 83/282; 83/451; 83/487;
  83/614; 156/406.4; 156/517
[58] Field of Search .............. 83/23, 56, 155, 205,
  83/221, 222, 231, 276, 280, 283, 273, 508, 451,
  563, 614, 636, 282, 374, 487; 271/198, 275;
  156/406.4, 405.1, 517; 198/463.3, 631

[56] References Cited

U.S. PATENT DOCUMENTS

| | | | |
|---|---|---|---|
| 3,355,339 | 11/1967 | Hineline | 156/112 |
| 3,813,974 | 6/1974 | Friberg et al. | 83/276 X |
| 3,899,383 | 8/1975 | Schultz et al. | 156/394 |
| 3,989,565 | 11/1976 | Appleby et al. | 83/508 X |
| 4,009,072 | 2/1977 | Schultz et al. | 156/584 |
| 4,053,342 | 10/1977 | Appleby et al. | 156/123 R |
| 4,383,458 | 5/1983 | Kitai et al. | 83/405 |
| 4,468,266 | 8/1984 | Cole et al. | 156/131 |
| 4,608,890 | 9/1986 | Still et al. | 83/49 |

Primary Examiner—E. R. Kazenske
Assistant Examiner—Hien H. Phan
Attorney, Agent, or Firm—Frederick K. Lacher; T. P. Lewandowski

[57] ABSTRACT

A sheet member is transported over a knife anvil by a feed conveyor movable from a first position adjacent the knife anvil to a second position overlapping the knife anvil. The feed conveyor has a moving belt which is driven in a forward direction for transporting the sheet member over the anvil and to a takeaway conveyor. The belt is driven in an opposite direction to pull the cut leading edge of the sheet material away from the end of the feed conveyor after cutting of the sheet material and during movement of the feed conveyor to the overlapping position over the anvil. A rotary knife is moved along the knife anvil and is mounted for rocking of the knife in a direction opposite to the direction of travel of the knife to provide a positive shear point.

16 Claims, 5 Drawing Figures

SHEET CUTTING AND TRANSPORTING SYSTEM

This invention relates generally to the cutting of sheet members and especially to transporting and cutting tire innerliners to-length prior to application of the innerliners to a tire building drum. Heretofore, innerliners were cut by electrically heated knives while the innerliner stock was supported on a takeaway belt conveyor. This procedure required periodic cleaning of the knife and caused deterioration of the belt. Other cutting systems have used retractable fingers for extending the stock across the knife anvil. These systems have not been completely satisfactory for innerliner stock which is thin, unreinforced, and requires support to avoid distortion and balling-up. The present invention maintains the support for the innerliner stock and avoids stretching forces which could distort the innerliner stock.

In accordance with one aspect of the invention there is provided apparatus for cutting a sheet member comprising a supporting structure, a knife anvil extending across the structure, a knife holder mounted on the structure for movement across the structure over the knife anvil, a knife mounted in the knife holder and engageable with the knife anvil for cutting a portion of the sheet member overlying the knife anvil, a feed conveyor assembly having a frame movable between a first position adjacent the knife anvil and a second position overlapping the knife anvil, means for moving the frame from the first position to the second position, means for driving the feed conveyor assembly to transport the sheet member over the knife anvil with the frame in the second position, means for moving the frame from the second position to the first position after the sheet member is transported over the knife anvil, and means for moving the knife holder in a direction across the supporting structure and over the knife anvil to cut the sheet member.

In accordance with another aspect of the invention there is provided a method of transporting and cutting a sheet member comprising:

(a) moving a conveyor assembly carrying a leading end of the sheet member from a first position adjacent a knife anvil to a second position overlapping the knife anvil;

(b) driving the conveyor assembly to transport the leading end of the sheet member to a position beyond the knife anvil;

(c) moving the conveyor assembly from the second position to the first position whereby the sheet member overlies the knife anvil;

(d) moving a knife member along the knife anvil to cut the sheet member; and (e) removing the cut sheet member from the knife anvil.

To acquaint persons skilled in the arts most closely related to the present invention, a certain preferred embodiment thereof illustrating a best mode now contemplated for putting the invention into practice is described herein by and with reference to the annexed drawings forming a part of the specification. The embodiment shown and described herein is illustrative and as will become apparent to those skilled in these arts can be modified in numerous ways within the spirit and scope of the invention defined in the claims hereof.

Figure 1:
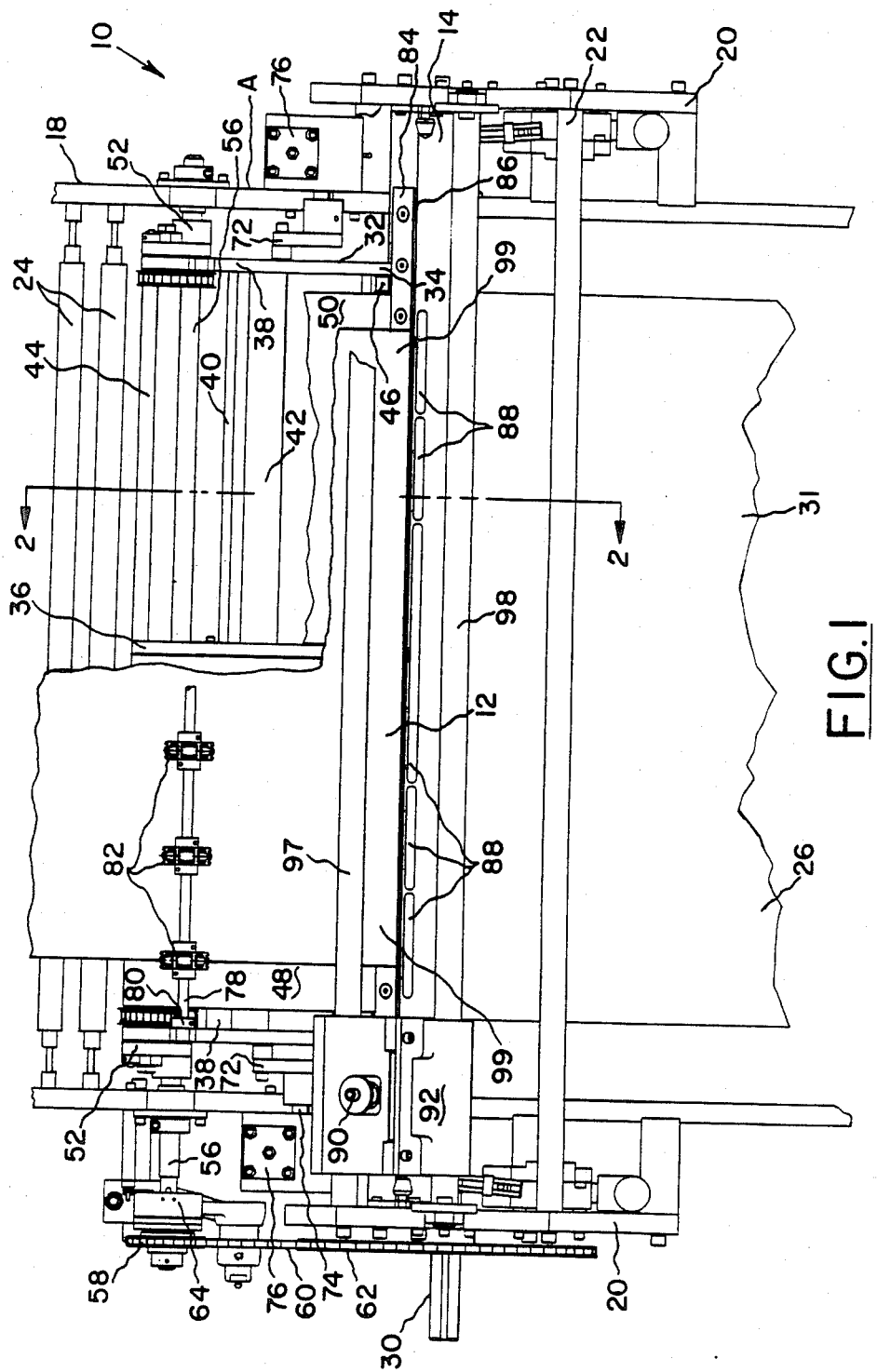
FIG. 1 is a fragmentary plan view of the apparatus embodying the invention with parts being broken away.
Figure 2:
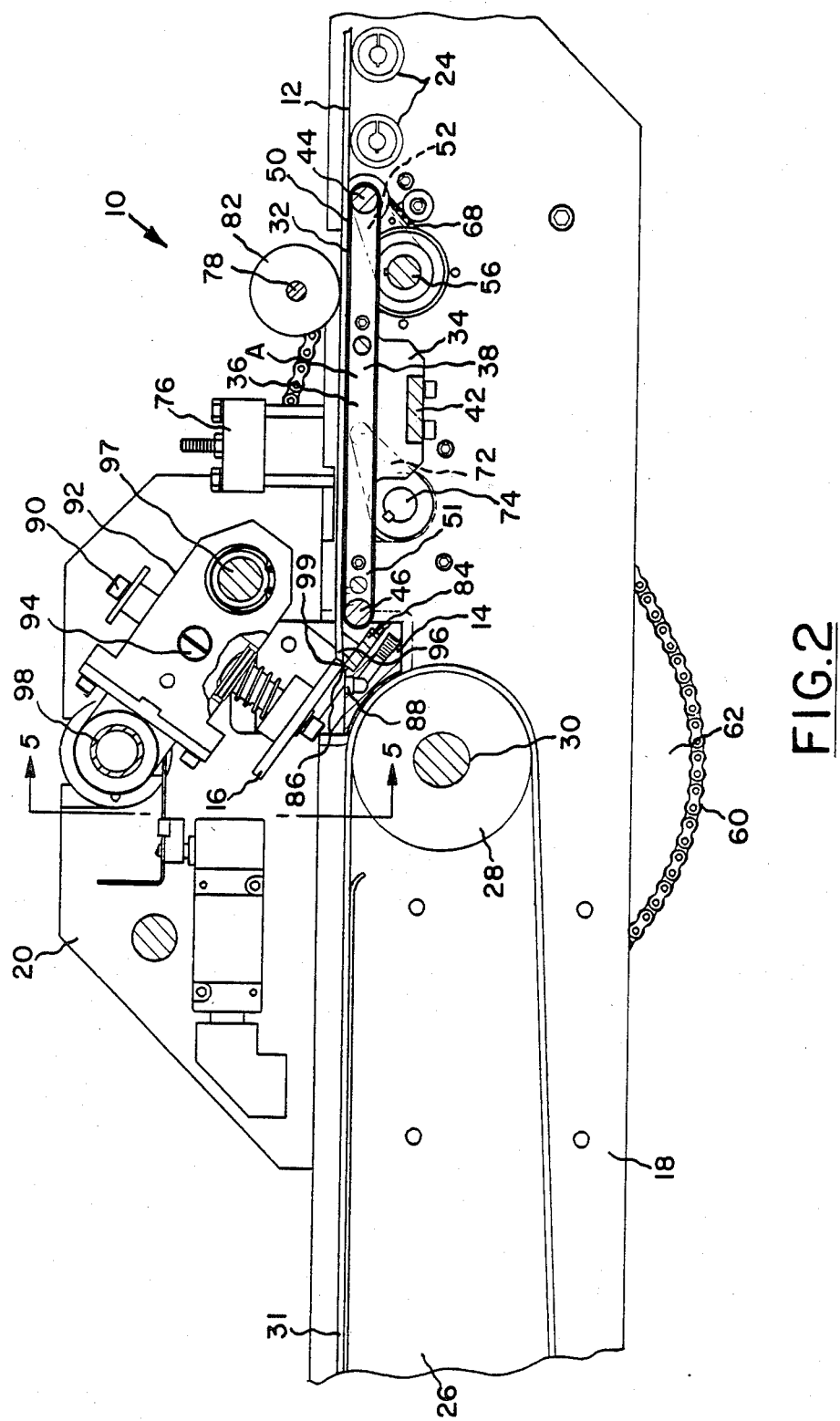
FIG. 2 is a sectional view taken along line 2—2 in FIG. 1 with parts being broken away.

Referring to FIGS. 1 and 2, a section of an innerliner cutting and applying assembly 10 is shown in which a sheet member such as innerliner 12 is conveyed over a knife anvil 14 for cutting by a rotary knife 16. The innerliner applying and cutting assembly 10 has a main frame 18 with side plates 20 connected by suitable transverse members such as spacer bars 22. The main frame 18 supports rollers 24 at the entrance end of the assembly and a takeaway conveyor 26 at the applier end. A drive pulley 28, which may be crowned, is rotatably mounted on an applier drive shaft 30 mounted on the main frame 18 and may be driven by a suitable applier drive such as a motor (not shown). The takeaway conveyor 26 has a belt 31 extending around the drive pulley 28 at one end of the conveyor and over an exit pulley (not shown) at the applier end for applying the innerliner 12 to a tire building machine drum.

Figure 3:
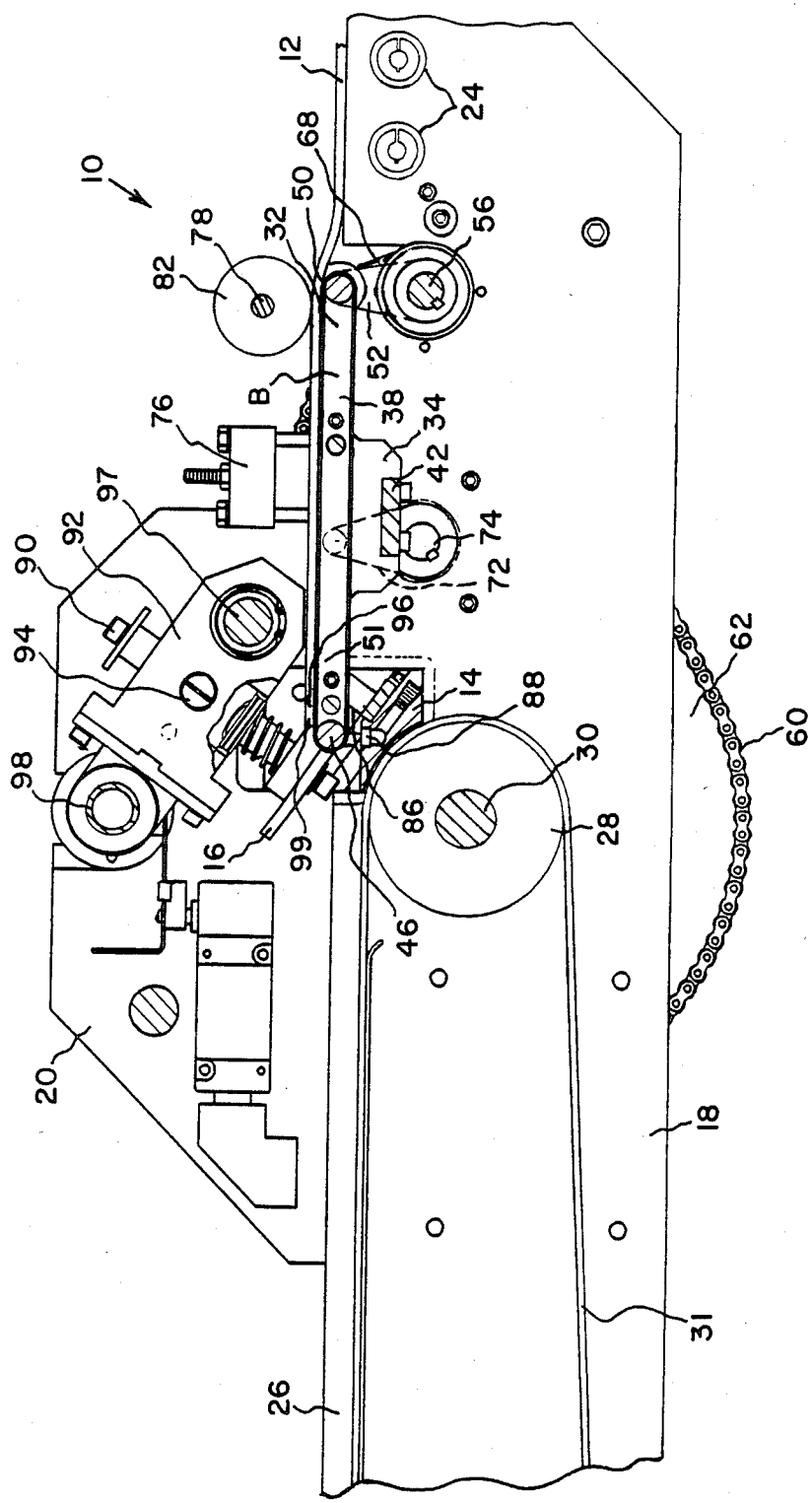
FIG. 3 is a view like FIG. 2 showing the feed conveyor overlapping the knife anvil.

A feed conveyor assembly such as advance conveyor 32 is located between the rollers 24 and the knife anvil 14 in a first lowered position A as shown in FIGS. 1 and 2 and in a second raised position B with the advance conveyor overlapping the knife anvil 14 as shown in FIG. 3. The advance conveyor 32 has a frame 34 with a central plate 36 and side plates 38 connected by transverse frame spacers 40 and a tie bar 42.

Figure 4:
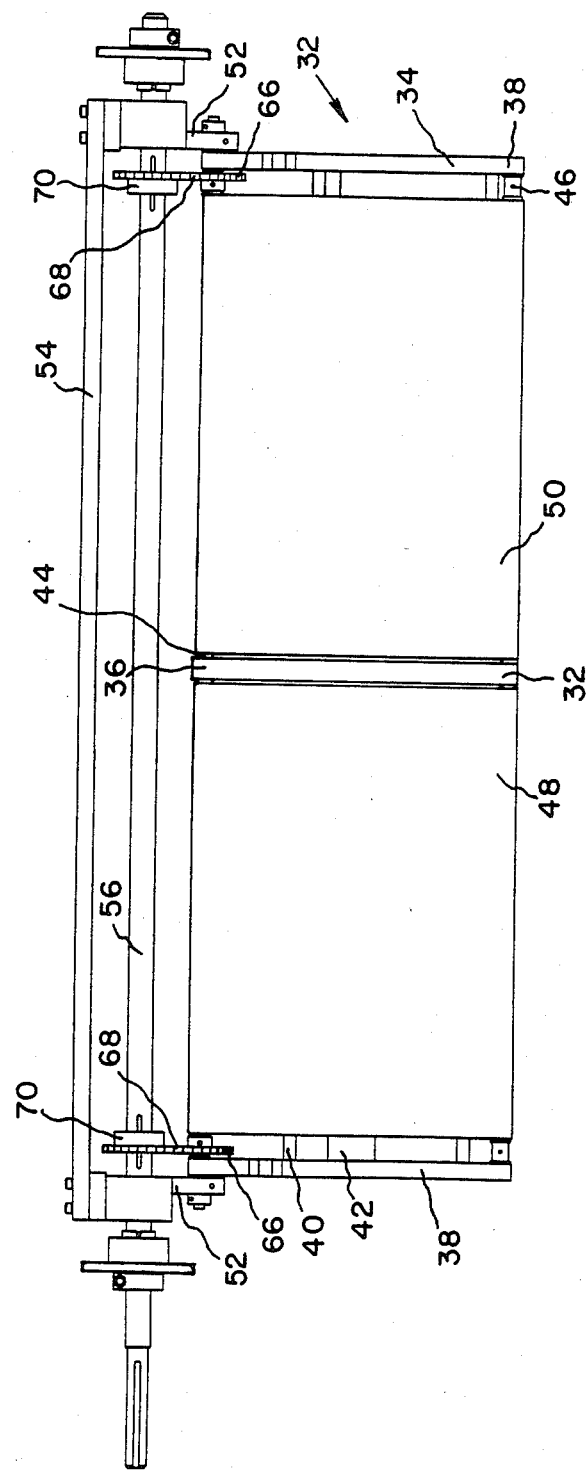
FIG. 4 is an enlarged plan view of the feed conveyor assembly with the idler arm conveyor drive linkage folded out to show the drive from the idle sprocket to the drive pulley.

Referring to FIG. 4, the advance conveyor 32 is shown in more detail. A drive pulley 44 is rotatably mounted on the central plate 36 and side plates 38 at the end of the advance conveyor 32 adjacent the rollers 24. A return pulley 46 is rotatably mounted on the central plate 36 and side plates 38 at the forward end 51 of the advance conveyor 32 adjacent the knife anvil 14. Separate belts 48 and 50 in side-by-side relation may extend around the drive pulley 44 and return pulley 46, as shown in FIG. 1, for conveying the innerliner 12.

Pivotally mounted on the side plates 38 of the advance conveyor 32 are bar members such as idler arms 52 connected to a tie bar 54 extending across the advance conveyor 32. The idler arms 52 have holes for receiving an idler shaft 56 which is rotatably mounted in holes in the side plates 20 of the main frame 18. As shown in FIG. 1, an idler sprocket 58 is mounted on the idler shaft 56 and is driven by a roller chain 60 extending around the idler sprocket and around a drive sprocket 62 mounted on the applier drive shaft 30. An advance conveyor clutch 64 may be interposed between the idler sprocket 58 and the idler shaft 56 to control the rotation of the idler shaft. An advance conveyor drive sprocket 66 is mounted on the drive pulley 44 and driven by a roller chain 68 extending around an idler shaft sprocket 70.

As shown in FIG. 2, the idler arms 52 are folded back from the position shown in FIG. 4 to a position with the arms underneath the advance conveyor 32 and pivoted about the idler shaft 56. The roller chain 60 extending around the drive sprocket 62 and the idler shaft sprocket 70 rotates the shaft and through the roller chain 68 rotates the drive pulley 44.

Intermediate the ends of the advance conveyor 32 are a second pair of bar members such as pivot arms 72 with one end of each of the arms pivotally connected to one of the side plates 38 and the other end of each of the pivot arms mounted on a drive shaft 74 of a rotary actuator 76. The idler arms 52 and the pivot arms 72 are substantially parallel bars for swinging movement of the frame 34 of the advance conveyor 32 between the first lowered position A and the second raised position B of the advance conveyor.

A holddown shaft 78 is mounted on brackets 80 fastened to the side plates 38 of the advance conveyor 32 and extends across the conveyor at a position above the belts 48 and 50. Holddown rollers 82 may be rotatably mounted on the shaft 78 for engagement with the innerliner 12 as it is fed toward the knife anvil 14.

As shown in FIGS. 1 and 2, the knife anvil 14 has an anvil insert 84 replaceably mounted on the anvil with a cutting edge 86. The anvil 14 also has openings 88 in communication with a source of vacuum for holding the innerliner 12 in place during the cutting operation.

Figure 5:
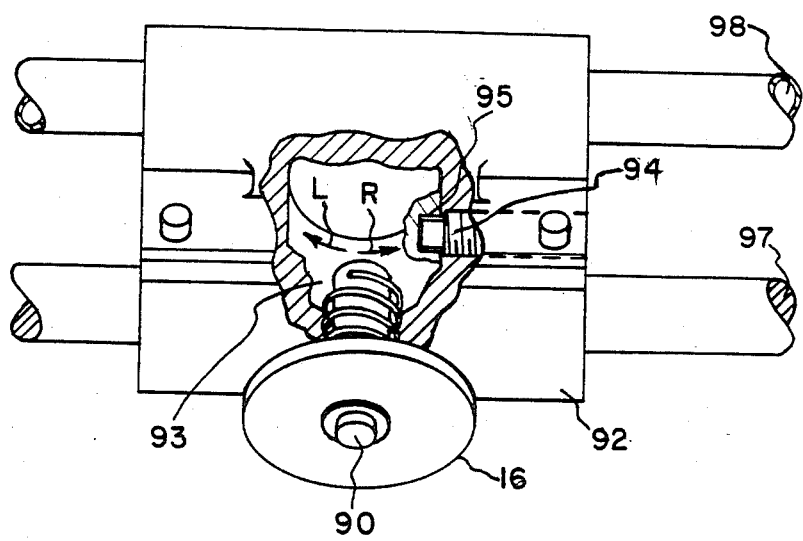
FIG. 5 is an enlarged fragmentary view of the rocker spindle housing and rotary knife taken along line 5—5 in FIG. 2 with parts being broken away to show the rocker spindle.

The rotary knife 16 is mounted on a spindle 90 rotatably supported in a knife holder such as rocker spindle housing 92 slidably mounted on a ball bushing shaft 97 and air cylinder 98 extending across the main frame 18 and beyond the side plates 20 so that the housing can move from a position of rest at either side of the advance conveyor 32. Suitable means such as a piston a with a magnetic coupling to the housing 92 in the cylinder 98 may be provided to move the housing 92 across the knife anvil 14 with the rotary knife 16 in cutting engagement with the cutting edge 86 of the anvil insert 84. The cylinder 98 is in communication with a source of air pressure at each end for moving the piston and housing 92 over the knife anvil 14 in both directions. As shown in FIG. 5, the spindle 90 is mounted for rocking movement of the rotary knife 16 in the housing 92 in an opposite direction from the direction in which the knife is moved over the anvil 14. The spindle 90 is supported in a cylindrical rocker 93 for rocking of the rotary knife 16 to the left as indicated by arrow L when the housing 92 is moved to the right as shown in FIG. 5. When the housing 92 is moved to the left, as shown in FIG. 5, the rotary knife 16 is rocked to the right as indicated by arrow R. The degree of rocking is limited by screw 94 extending into oversize hole 95 in the wall of the rocker 93. This rocking movement provides a positive shear point 96 between the rotary knife 16 and the cutting edge 86 of the anvil insert 84 as shown in FIG. 2.

In operation, the innerliner 12 is in the position shown in FIGS. 1 and 2 after the innerliner has been cut by the rotary knife 16 and the cut sections conveyed by the takeaway conveyor 26 to a tire building machine. A leading end 99 extends beyond the forward end 51 of the advance conveyor 32 in the cut position as shown in FIGS. 1 and 2. The advance conveyor 32 is then moved from the lowered position A, as shown in FIG. 2, to the raised position B, as shown in FIG. 3, by actuating the rotary actuator 76 at each side of the advance conveyor 32 causing the end drive shaft 74 to rotate in the counterclockwise direction as shown in FIGS. 2 and 3. The pivot arms 72 and idler arms 52 are then rotated to lift the frame 34 of the advance conveyor 32 to the raised position B. During the lifting operation the leading end 99 of the innerliner 12 is pulled toward the forward end 51 of the advance conveyor 32 by movement of the belts 48 and 50 due to the rotation of the advance conveyor drive sprocket 66 by the roller chain 68 in engagement with the stationary idler shaft sprocket 70. This is desirable because the leading end 99 is not folded under the forward end 51 while the advance conveyor 32 is being lifted. During this operation the takeaway drive clutch (not shown) connected to the drive shaft 30 is disengaged and the advance conveyor clutch 64 is engaged. After the advance conveyor 32 is moved into the raised position B, as shown in FIG. 3, the takeaway conveyor clutch is engaged causing the roller chain 60 to rotate the shaft 56 and idler shaft sprocket 70. The roller chain 68 then rotates the advance conveyor drive sprocket 66 for rotating the drive pulley 44 and causing the belts 48 and 50 to move forward. At the same time, the drive pulley 28 of the takeaway conveyor 26 which is mounted on the drive shaft 30 is rotated in the counterclockwise direction, as shown in FIG. 3, to move the belt 31 in a forward direction and pay out the innerliner 12 to the desired length for application to a tire building machine drum. The diameters of the sprockets 58, 62, 66 and 70 are such that the surface speed of the takeaway conveyor belt 31 and the advance conveyor belts 48 and 50 are substantially the same. When the desired length of innerliner 12 has been paid out, the belts are stopped by disengaging the drive clutch and engaging a drive brake (not shown).

At this point the advance conveyor 32 is moved from the raised position B to the lowered position A by actuating each rotary actuator 76 to cause the drive shaft 74 to rotate in the clockwise direction as shown in FIGS. 2 and 3 causing pivot arms 72 and idler arms 52 to swing the frame 34 of the advance conveyor to the rear and downward. During this movement the roller chain 68, which is in engagement with the stationary idler shaft sprocket 70, rotates the advance conveyor drive sprocket 66 in a clockwise direction causing the belts 48 and 50 of the advance conveyor 32 to move in a forward direction and reduce the pull on the innerliner 12.

The rocker spindle housing 92 for the rotary knife 16 is then moved along the knife anvil 14 with the edge of the knife in cutting engagement with the cutting edge 86 of the anvil insert 84 as shown in FIG. 2. The spindle housing 92 is magnetically connected to the piston in cylinder 98 for moving the housing from the position at the left side of the conveyors, shown in FIG. 1, to a position at the right side for making one cut in response to air pressure communicated to the left end of the cylinder. Then after the next length of the innerliner 12 has been paid out, the housing 92 is moved from the position at the right side back to the position at the left side as shown in FIG. 1 in response to air pressure communicated to the right end of the cylinder 98.

As shown in FIG. 5, the spindle 90 is mounted in the spindle housing 92 for rocking of the rotary knife 16 in the housing in a direction opposite to the direction of travel of the knife over the anvil insert 84 to provide a positive shear point 96 for cutting the innerliner 12. In order to hold the innerliner 12 in a fixed position during the cutting operation, vacuum is applied to the passages communicating with the openings 88 in the anvil 14.

Next the advance conveyor clutch 64 is disengaged the drive brake is released and the takeaway clutch engaged for transporting the cut length of the innerliner 12 to the exit end of the conveyor 26 for application to the tire building machine drum. Before this, the vacuum communicated to the openings 88 is discontinued to release the trailing end of the innerliner 12. After the cut length of innerliner 12 has been conveyed to the tire building machine drum, the innerliner applying and cutting assembly 10 is in the condition shown in FIGS. 1 and 2. The cutting and transporting steps described hereinabove may then be repeated.

While a certain representative embodiment and details have been shown for the purpose of illustrating the invention, it will be apparent to those skilled in the art that various changes and modifications may be made therein without departing from the spirit or scope of the invention.

What is claimed is:

1. A method of transporting and cutting a sheet member comprising:
   (a) moving a feed conveyor assembly carrying said sheet member from a first position adjacent and on one side of a knife anvil to a second position overlapping said knife anvil;
   (b) driving said feed conveyor assembly to transport said sheet member to a position beyond said knife anvil;
   (c) moving said feed conveyor assembly from said second position to said first position whereby said sheet member overlies said knife anvil;
   (d) moving a knife member along said knife anvil to cut said sheet member; and
   (e) removing a cut section of said sheet member from said knife anvil.

2. The method of claim 1 wherein the step of removing said cut section of said sheet member includes transporting said cut section of said sheet member to a position downstream of said knife anvil by a takeaway conveyor located on the opposite side of said knife anvil from said feed conveyor.

3. The method of claim 2 including driving said takeaway conveyor and said feed conveyor assembly so that said conveyors have substantially the same surface speed.

4. The method of claim 1 wherein said feed conveyor assembly includes a belt extending between a drive pulley and an idler pulley and during the movement of said conveyor assembly from said first position to said second position a leading end of said sheet member is pulled away from a forward end of said feed conveyor assembly adjacent said knife anvil by movement of said belt.

5. The method of claim 1 wherein said feed conveyor assembly includes a belt extending between a drive pulley and an idler pulley and during the movement of said conveyor assembly from said second position to said first position said sheet member is moved in a direction toward a forward end of said feed conveyor assembly adjacent said knife anvil by movement of said belt.

6. The method of claim 1 wherein said knife member is a rotary knife mounted on a knife holder movable across said sheet member and in cutting engagement with said knife anvil including rocking of said knife in said knife holder in a direction opposite to the direction of travel of said knife over said knife anvil to provide a positive shear point for cutting said sheet member.

7. The method of claim 1 wherein said knife anvil includes vaccum means for holding said sheet member in place during movement of said knife member along said knife anvil to cut said sheet member.

8. Apparatus for cutting a sheet member comprising a supporting structure, a knife anvil extending across said supporting strucutre, a knife holder mounted on said structure for movement across said structure over said knife anvil, a knife mounted in said knife holder and engageable with said knife anvil for cutting a portion of said sheet member overlying said knife anvil, a feed conveyor assembly having a frame said frame being movable between a first position adjacent said knife anvil and a second position overlapping said knife anvil, means for moving said frame from said first position to said second position, means for driving said feed conveyor assembly to transport said sheet member over said knife anvil with said frame in said second position, means for moving said frame from said second position to said first position after said sheet member is transported over said knife anvil, and means for moving said knife holder in a direction across said supporting structure and over said knife anvil to cut said sheet member with said knife.

9. The apparatus of claim 8 wherein said means for moving said frame between said first position and said second position includes spaced bar members pivotally connecting said supporting structure and said frame for swinging movement of said frame between said first position and said second position and power means for swinging at least one of said bar members to move said frame.

10. The apparatus of claim 9 wherein said power means includes a rotary actuator mounted on said supporting structure and having a drive shaft in driving engagement with said one of said bar members.

11. The apparatus of claim 10 wherein said means for driving said feed conveyor assembly includes a drive pulley having a drive sprocket, an idler shaft mounted on said supporting structure and having an idler sprocket engageable by a roller chain for rotating said idler shaft, an idler shaft sprocket mounted on said idler shaft and connected to said drive sprocket by a feed conveyor roller chain for rotating said drive pulley and said bar members including a pair of idler arms pivotally connected at one end to said frame for rotation about the axis of said drive pulley and pivotally connected at the other end to said supporting structure for rotation about the axis of said idler shaft.

12. The apparatus of claim 11 including a takeaway conveyor positioned downstream of said knife anvil for receiving and transporting said sheet member when said frame of said feed conveyor assembly is in said second position, a takeaway drive pulley mounted on a drive shaft rotatably supported by said supporting structure, a takeaway drive sprocket mounted on said takeaway drive shaft, a takeaway roller chain extending around said takeaway drive sprocket and said idler sprocket for driving said feed conveyor and said takeaway conveyor and a feed conveyor clutch mounted on said idler shaft for controlling the rotation of said idler shaft relative to said idler sprocket.

13. The apparatus of claim 8 including a takeaway conveyor positioned downstream of said knife anvil for receiving and transporting said sheet member when said frame of said feed conveyor assembly is in said second position.

14. The apparatus of claim 13 wherein said means for driving said feed conveyor assembly includes means for driving said takeaway conveyor and speed control means for controlling the speed of said feed conveyor and said takeaway conveyor so that said converyors are driven at substantially the same surface speed.

15. The apparatus of claim 8 wherein said knife is a rotary knife mounted on said knife holder having means for rocking of said knife in said knife holder in an opposite direction from a direction in which said knife is moved over said knife anvil to provide a positive shear point between said knife and said knife anvil when cutting said sheet member.

16. The apparatus of claim 8 wherein said knife anvil includes vacuum means for holding said sheet member in place during movement of said knife holder across said supporting structure and over said anvil to cut said sheet member.

* * * * *